April 18, 1950  D. A. OLIVER  2,504,870
METHOD OF MANUFACTURING PERMANENT MAGNETS
Filed Feb. 7, 1948
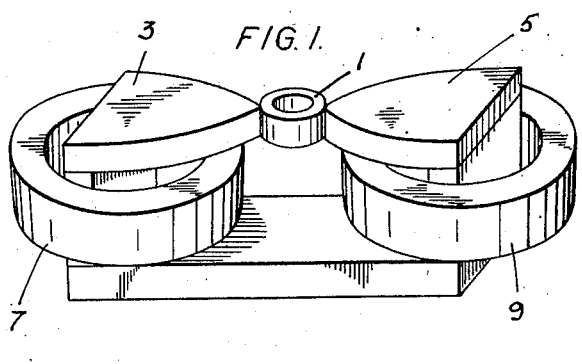
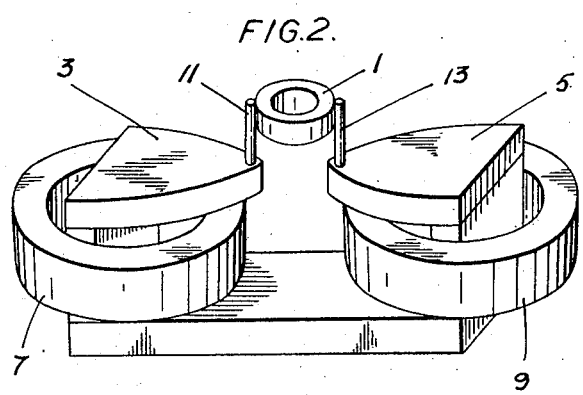
Inventor
Donald Arthur Oliver
By
Attorneys.

Patented Apr. 18, 1950

2,504,870

UNITED STATES PATENT OFFICE 2,504,870

METHOD OF MANUFACTURING PERMANENT MAGNETS

Donald Arthur Oliver, Sheffield, England, assignor to William Jessop & Sons Limited, Sheffield, England, a British company Application February 7, 1948, Serial No. 7,022
In Great Britain February 7, 1947

6 Claims. (Cl. 148—10)

The present invention is concerned with improvements in or relating to methods of manufacturing permanent magnets of the kind employed in electric apparatus with metal vanes of drums which need damping, such as electric current consumption meters, electric energy meters with voltage and current coils and induction type instruments, and is particularly concerned with the manufacture of magnets of the kind specified which are formed from the newer magnetic alloy steels which have a coercivity of 200 oersted or greater normally 500–900 oersted and which are magnetically anisotropic, that is to say, the properties of the magnet (e. g. the $(BH)_{max}$ value), in one principal direction are enhanced at the expense of similar properties in two other directions at right angles to each other and to the principal direction. For convenience the invention will be described with reference to the type of magnet employed in the electric integrating meters of the Coulomb or ampere-hour type; it will however be appreciated that the invention is not limited to such magnets.

In electric integrating meters of the Coulomb or ampere-hour type which measure only the quantity of electricity passed (constancy of supply voltage being assumed) it is customary to incorporate therein two annular C-shaped permanent magnets, the air gap between the poles of the magnets being merely sufficiently large to allow part of a non-magnetic rotor to be disposed therebetween. It is advantageous for such magnets to be made from the newer magnetic alloy steels which have a coercivity of 200 orested or greater, since these steels, especially when magnetized anisotropically, have a large $(BH)_{max}$ value, that is to say, a large stored magnetic energy content per unit volume. Accordingly the use of such alloy steels enables the dimensions of the magnets, and hence of the meter, to be reduced, or the number of magnets to be reduced.

In order to magnetise anisotropically a permanent magnet alloy, so as to provide an increased $(BH)_{max}$ value in a principal direction, it is known to cool the alloy in a constant unidirectional magnetic field from a high temperature such as, for example, 1200° C. This method has been described in a paper by Oliver and Shedden which appeared in "Nature" 142 dated July 30, 1938, at page 209. A method of manufacturing an anisotropic permanent magnet from a ring casting has also been proposed in which the magnet is cooled in a circular coaxial magnetic field.

It is an object of this invention to provide an improved method of manufacturing anisotropically-magnetised permanent magnets of the kind specified which are formed from the newer alloy magnetic steels of high permeability having a coercivity of 200 oersted or greater.

According to the present invention a permanent magnet of the kind specified is manufactured by a method in which a ring casting fabricated from a magnetic alloy having a coercive force of 200 oersted or greater is heated to a temperature in excess of its Curie temperature and is then allowed to cool to a temperature below its Curie temperature at a controlled rate, during which cooling two semi-circular leakage fields are applied in such manner that the path of magnetic flux is divided between two diametrically opposed neutral points, one portion passing through one semi-circular segment of the ring casting and the other portion passing through the remaining segment of the casting.

In order that the invention may become apparent one convenient method of manufacturing anisotropically-magnetised permanent magnets of the kind specified provided by the invention and illustrative thereof will now be described with reference to the accompanying drawings in which:

Figure 1 shows diagrammatically an apparatus for producing an anisotropic magnetisation in accordance with the features of the invention; and Figure 2 shows diagrammatically a modified form of the apparatus.

According to this illustrative method an annular or ring casting 1 is formed from a magnetic steel or alloy which has a coercivity of 200 oersted or greater. For example, the alloy may be that known under the registered trade-mark Alcomax II having as constituents

| | Per cent |
|---|---|
| Carbon | Up to 0.06 |
| Nickel | 11.5 |
| Aluminium | 8 |
| Copper | 4 |
| Cobalt | 21 | the balance being iron and unavoidable impurities. This ring casting 1, as seen in Figure 1, is located between two elliptical pole pieces 3 and 5 disposed within the coils 7 and 9 of a direct current electro-magnet and is held by the pole pieces at diametrically opposite points on the annular periphery of the casting, whereby "point"

poles are assimilated as close to the casting as possible.

In the modified form of apparatus illustrated in Figure 2, the ring casting 1 is located between two vertically disposed pins 11 and 13, each pin being formed on or fixed to the upper surface of the pole pieces 3 and 5 and located in spaced relationship one to the other so that a ring casting may be held between the pins in the manner described as when positioned co-planar with the pole pieces. By this arrangement the magnetic field between the pole pieces 3 and 5 is raised so that energisation of the ring casting 1 takes place between the projecting pole pieces constituted by the pins 11 and 13.

The ring casting 1 is first heated by any suitable means such as a furnace or a high-frequency induction heating coil to a temperature which is in excess of the Curie temperature for that alloy, a suitable and preferred temperature being 1200° C. When this temperature has been exceeded the magnet or the source of heat is removed, or where high-frequency induction heating is employed the energy is gradually reduced in such manner as to provide a controlled rate of cooling, and at the same time the electromagnet is energised from a suitable source of energy, i. e. heavy direct current so that a magnetic field passes through the ring casting 1, the lines of magnetic force set up between the pole pieces 3 and 5 following approximately two halves of the casting divided by the diametrically opposed neutral points. This leakage field is maintained until the temperature of the ring casting 1 has reached 500° C., that is to say the temperature is below the Curie temperature, and then the electromagnet is de-energised.

It clearly will be seen that by cooling the ring casting 1 in the aforesaid leakage field it will have become magnetised anisotropically, the two neutral points in its area being adjacent to the pole pieces.

When the ring casting 1 has cooled down to room temperature it is removed from the electromagnet and aged or tempered without the field. Afterwards a small air-gap is made in the magnetic circuit of the casting by removing, at one or other of the aforesaid neutral points, a radial portion thereof in a suitable manner, such as by a high-speed refractory slitting wheel. The resultant more or less C-shaped casting now exhibits after magnetisation the properties of a magnet having a high (BH)max value and may be employed in an electric current consumption meter if the width of the air-gap has been chosen correctly.

The apparatus hereinbefore described and illustrated is merely exemplary of the invention, and it will be appreciated that for automatic production the apparatus may be arranged and adapted to feed the castings in turn from a hopper and automatically position them about the electromagnet with respect to an induction heating coil, the initial heating and subsequent controlled cooling rate being also automatically effected by say a programme timing switch or other suitable means.

Having thus described my invention, what I claim as new and desire to secure by Letters Patent is:

1. A method of manufacturing a permanent magnet formed from a magnetic alloy having a coercive force of at least 200 oersted, comprising the heating of a ring casting fabricated from said alloy to a temperature in excess of its Curie temperature, gradually cooling said casting to a temperature below its Curie temperature, and applying to said casting during cooling two semi-circular leakage fields in such manner that the path of magnetic flux is divided between two diametrically opposed neutral points, one portion passing through one semi-circular segment of the ring casting and the other portion passing through the remaining segment of said casting.

2. A method of manufacturing a permanent magnet formed from a magnetic alloy having a coercive force of at least 200 oersted, comprising the heating of a ring casting fabricated from said alloy to a temperature in excess of its Curie temperature, gradually cooling said casting to a temperature below its Curie temperature, applying to said casting during cooling two semi-circular leakage fields through two pole pieces of an electro-magnet, said pole pieces being in contact with the ring casting at substantially diametrically opposite peripheral points which constitute neutral points in the two divided semi-circular leakage fields where the leakage lines are diverted from their semi-circular path towards the pole pieces of the magnet.

3. A method of manufacturing a permanent magnet as defined in claim 2, wherein said ring casting is heated to a temperature of 1200° C., and is cooled from said temperature to 500° C.

4. A method of manufacturing a permanent magnet as defined in claim 2, wherein said magnetic alloy has a coercive force of at least 200 oersted, and has as constituents:

| | Per cent |
|---|---|
| Carbon | Up to 0.06 |
| Nickel | 11.5 |
| Aluminium | 8.0 |
| Copper | 4.0 |
| Cobalt | 21.0 | the balance being iron and unavoidable impurities.

5. A method of manufacturing a permanent magnet formed from a magnetic alloy having a coercive force of at least 200 oersted, comprising locating a ring casting composed of said alloy between two pole pieces disposed within the coils of an electro-magnet, surrounding the ring casting by a high-frequency induction-heating coil, supplying high-frequency alternating-current energy to said heating coil and thereby heating the ring casting until it has exceeded its Curie temperature, controlling the supply of energy to said heating coil to provide a gradual cooling of the ring casting and simultaneously supplying current to said electro-magnet to thereby apply two semi-circular leakage fields to the ring casting, interrupting the supply of current to the electro-magnet when the temperature of the ring casting has fallen below the Curie temperature, removing the ring casting from the pole pieces of the electro-magnet and from the induction heating coil, ageing the casting, and removing a radial portion of the ring casting to provide an air-gap therein.

6. A method of manufacturing a permanent magnet formed from a magnetic alloy having a coercive force of at least 200 oersted, comprising placing a ring casting composed of said alloy between the two pole pieces disposed within the coils of an electro-magnet and surrounding the ring casting by a high-frequency induction-heating coil, supplying high-frequency alternating-current energy to the heating coil and heating the ring casting until it has exceeded its Curie temperature, reducing the supply of high-frequency energy to the heating coil to provide a gradual cooling of said casting and simultaneously supplying current to the electro-magnet to energize it and thereby apply two semi-circular leakage fields to the ring casting, interrupting the supply of current to the electro-magnet when the temperature of the ring casting has fallen below the Curie temperature, removing the ring casting from the pole pieces of the electro-magnet and from the induction-heating coil, ageing the casting, and removing a radial portion of the casting by means of a high speed refractory slitting wheel to provide an air-gap therein.

DONALD ARTHUR OLIVER.

REFERENCES CITED

The following references are of record in the file of this patent:

UNITED STATES PATENTS

| Number | Name | Date |
|---|---|---|
| 528,635 | Hoyt | Nov. 6, 1894 |
| 1,955,141 | Meyer | Apr. 17, 1934 |
| 2,145,712 | Dahl et al. | Jan. 31, 1939 |